(No Model.)
T. STRAUS.
AUTOMATIC TROLLEY WIRE FINDER.
No. 518,357. Patented Apr. 17, 1894.
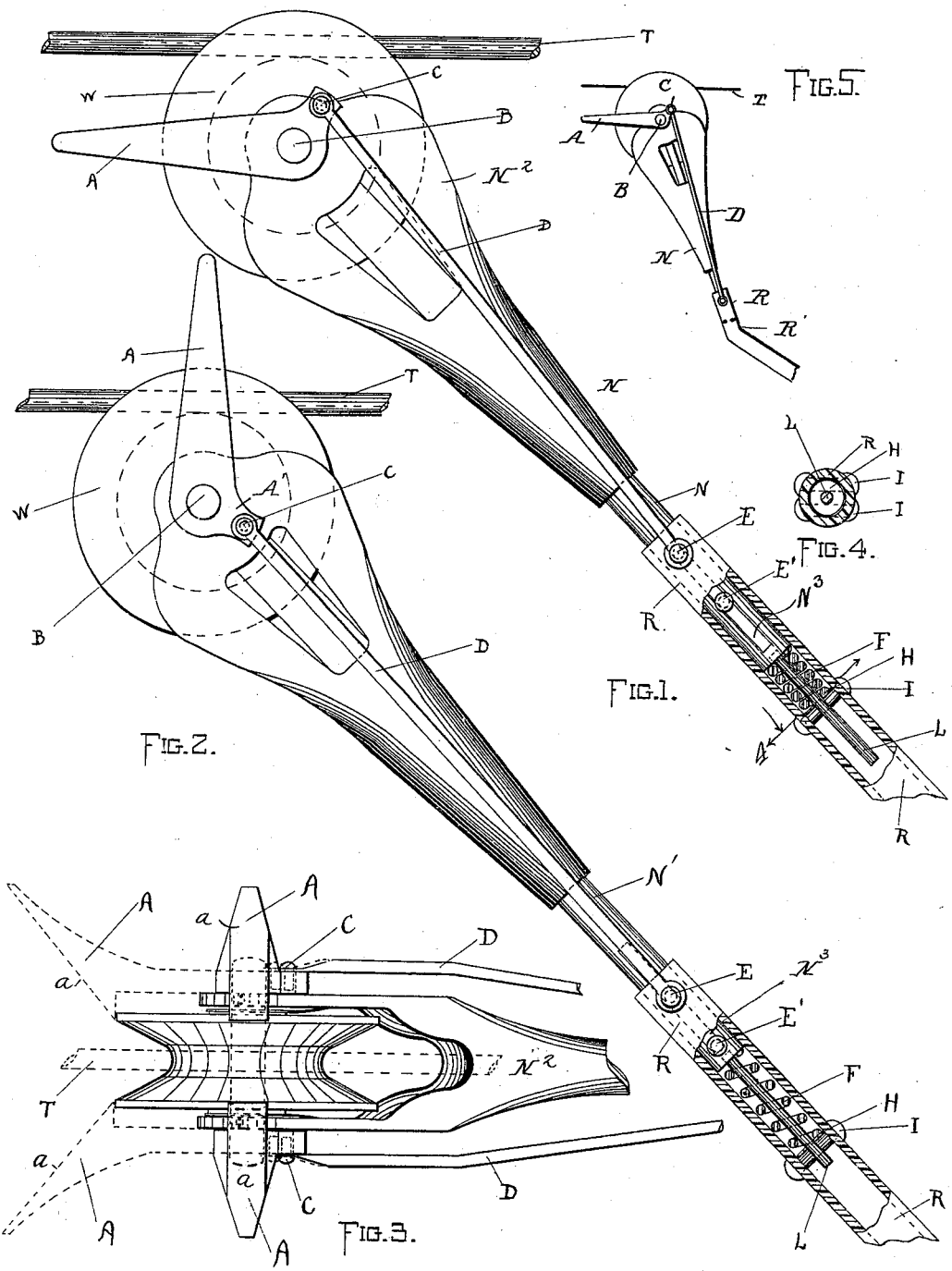
WITNESSES:
INVENTOR,
Theodore Straus
BY
Watson
ATTORNEY.
THE NATIONAL LITHOGRAPHING COMPANY,
WASHINGTON, D. C.

UNITED STATES PATENT OFFICE.

THEODORE STRAUS, OF BALTIMORE, MARYLAND.

AUTOMATIC TROLLEY-WIRE FINDER.

SPECIFICATION forming part of Letters Patent No. 518,357, dated April 17, 1894.

Application filed January 26, 1894. Serial No. 498,115. (No model.)

*To all whom it may concern:*

Be it known that I, THEODORE STRAUS, a citizen of the United States, residing at Baltimore, in the State of Maryland, have invented certain new and useful Improvements in Trolley-Guides, of which the following is a specification.

My invention relates to trolley guides for electric cars and it consists in a guide or replacer which comes automatically into action when the trolley leaves, or tends to leave, the wire and returns to its normal position when the trolley is again replaced.

In the following specification I shall describe the invention in such full, clear and exact terms as will enable others skilled in the art to make and use the same, reference being had to the accompanying drawings, in which—

Figure 1 is a side elevation of a trolley and part of the supporting arm, the guides being in their normal or inactive position. Fig. 2 is a similar view showing the guides raised. Fig. 3 is a plan view, the guides being represented in operative position in full lines, and in their normal position in dotted lines. Fig. 4 is a sectional view on the line 4—4 of Fig. 1, and Fig. 5 is a general view showing a larger portion of the trolley arm than is shown in the other figures.

Referring to the drawings, R indicates the usual trolley arm which in this instance is hollow at its outer end, and N a sliding extension of the same, which is provided with a shank N' free to move endwise in the arm proper. The extension N is also provided with a bifurcated head or frame $N^2$ in which the trolley wheel W is mounted upon a shaft or axle B. The axle B extends beyond the sides of the frame $N^2$, and upon the projecting portions on either side of the frame are pivoted a pair of guides A which extend beyond the wheel and have inclined faces $a$ extending from the edges of the groove in the wheel outwardly, the spread between their outer ends being several times greater than the width of the wheel, and to that extent facilitating the placing of the wheel upon the wire when the guides are vertical.

The guides A have short arms A' arranged at an angle to their main portions or longer arms, and these shorter arms are connected by pivots C to rods D the opposite ends of which are connected to the trolley arm proper by a pivot E.

The shank N of the extension fits and slides within the hollow end of the arm R, its movement therein being limited by fixed pins or rivets E E' which pass through a slot $N^3$ in the shank N.

The sliding extension of the trolley arm is normally pressed outward by means of a spring F, one end of which bears upon the shank N' while the other end bears upon a support or washer H, which in turn rests upon a pair of pins or rivets I. The spring surrounds and is guided by a rod L, one end of which is fastened to the shank N while the other end passes through the washer H and between the rivets I.

In the drawings the overhead wire is represented by T.

To facilitate the operation of my invention I prefer to bend the trolley arm R sharply upward, as shown at R' in Fig. 5, to increase the effect of the reaction of the wire upon the spring F.

The operation of the invention is as follows: When the trolley wheel is against the wire, the force of the main trolley arm operating spring (not shown) presses the wheel with sufficient force against the wire to compress the spring F, the effect of which is to shorten the distance between the fixed pivot E and the trolley axle B, thus through the medium of the connecting rod D and the shorter arm A' throwing the guides A into a horizontal position as shown in Fig. 1 and in the dotted lines in Fig. 3. If, however, the trolley leaves the wire accidentally, or is pulled down intentionally, the spring F immediately expands and forces the sliding section N outward, thus increasing the distance between the fixed pivot E and axle B and throwing the guides A into a vertical position as shown in Figs. 2 and 3. It will be evident that they will remain in this position until the trolley is again placed upon the wire, when the action of the main spring of the trolley arm will again compress the small spring F and throw the guides into their horizontal position, in which position they are out of the way of insulators and other obstructions along the wire.

Among the advantages of my improved trolley guide it may be stated that the action is entirely automatic, and that whenever the trolley tends to leave the wire, the guides are immediately thrown up into position to replace it. If the trolley leaves the wire accidentally, in most instances it will be immediately replaced automatically, the guides rising before the trolley has left the wire to a distance beyond their reach. The guides also facilitate replacing the trolley upon the wire when it is pulled down by a cord or rope as is customary in reversing a car at the end of a route.

Another advantage of my invention is that the sliding extension permits the wheel to adjust itself to the wire more perfectly in going around curves, and this feature in connection with the automatic guides renders it almost impossible for the trolley to escape from the wire on curves as well as at other portions of the line.

Having described my invention, what I claim, and desire to secure by Letters Patent, is—

1. The combination with a trolley arm, of a sliding extension at the outer end of said arm, a spring arranged to urge said extension outward, a trolley, pivoted guides upon the extension, and connections between the guides and the trolley arm, whereby the former are automatically made operative when the trolley leaves the wire, substantially as described.

2. The combination with a trolley arm, of a sliding extension at the outer end of the said arm, a trolley wheel and inclined guides pivotally mounted in the outer end of the extension, connecting rods pivoted to the guides and to the trolley proper, a spring arranged to urge the extension outward, and a stop to limit its outward movement, substantially as described.

3. The combination with the hollow trolley arm, of the sliding extension having a shank fitting therein, the spring urging said extension outward, the trolley wheel in the bifurcated head of the extension, the inclined guides pivoted on the outside of the head and provided with short arms, and the rods connecting said short arms with the trolley arm proper, substantially as described.

4. The combination with a trolley arm bent upwardly near its outer end, of a spring-projected sliding extension, a trolley wheel and inclined guides pivotally mounted in said extension, said guides being automatically operated by the pressure of the trolley upon the wire, substantially as described.

In testimony whereof I affix my signature in presence of two witnesses.

THEODORE STRAUS.

Witnesses:
CHAS. L. HUTCHINS,
JNO. WATSON, Jr.